Patented July 5, 1949

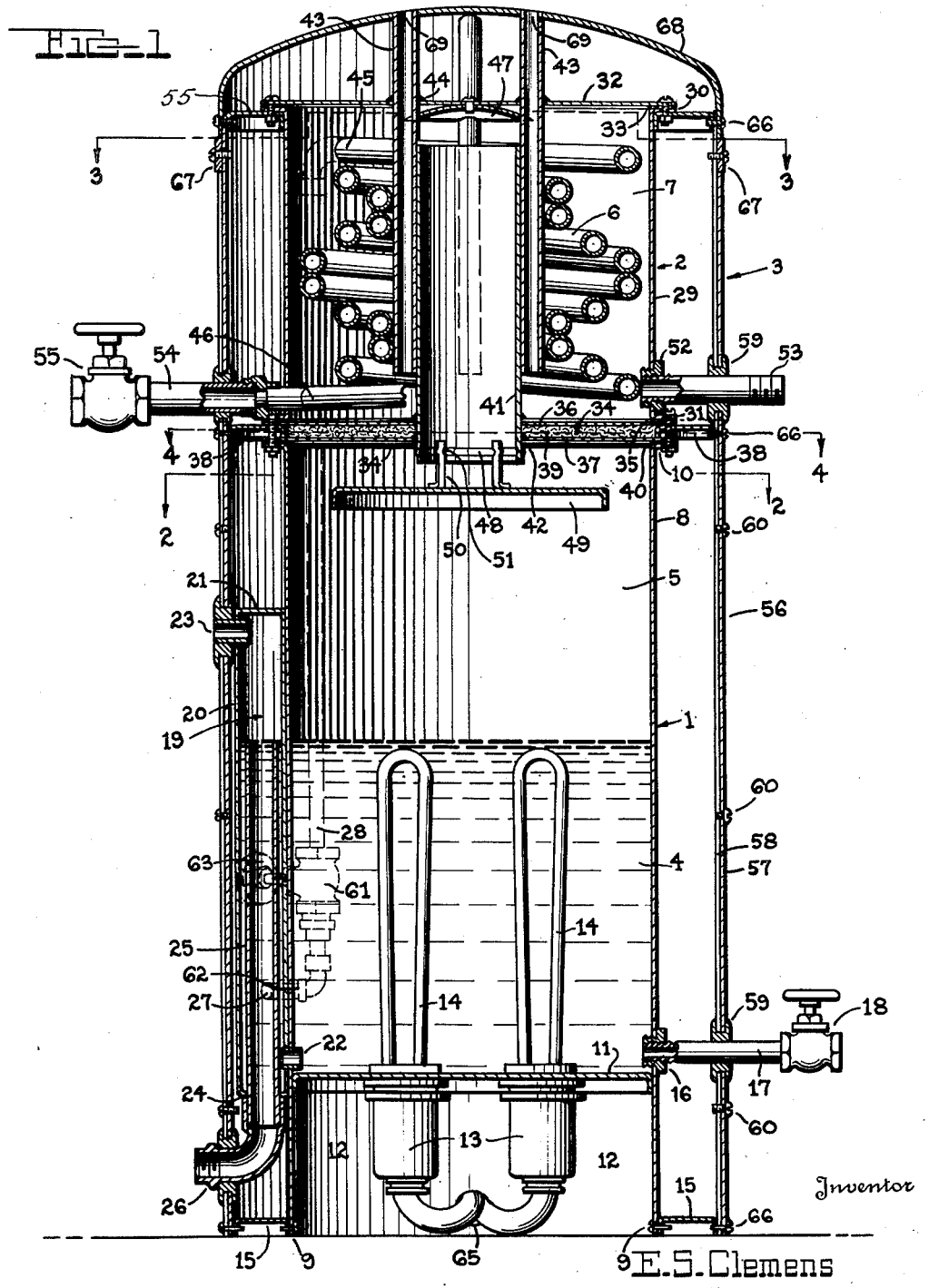

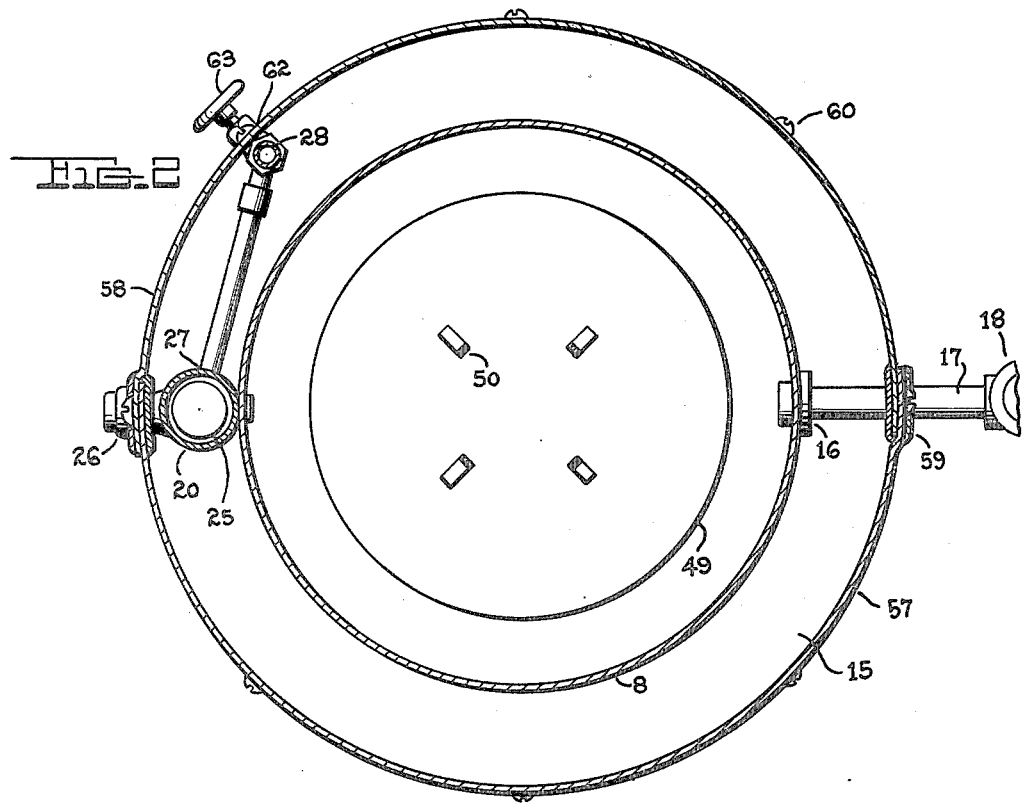
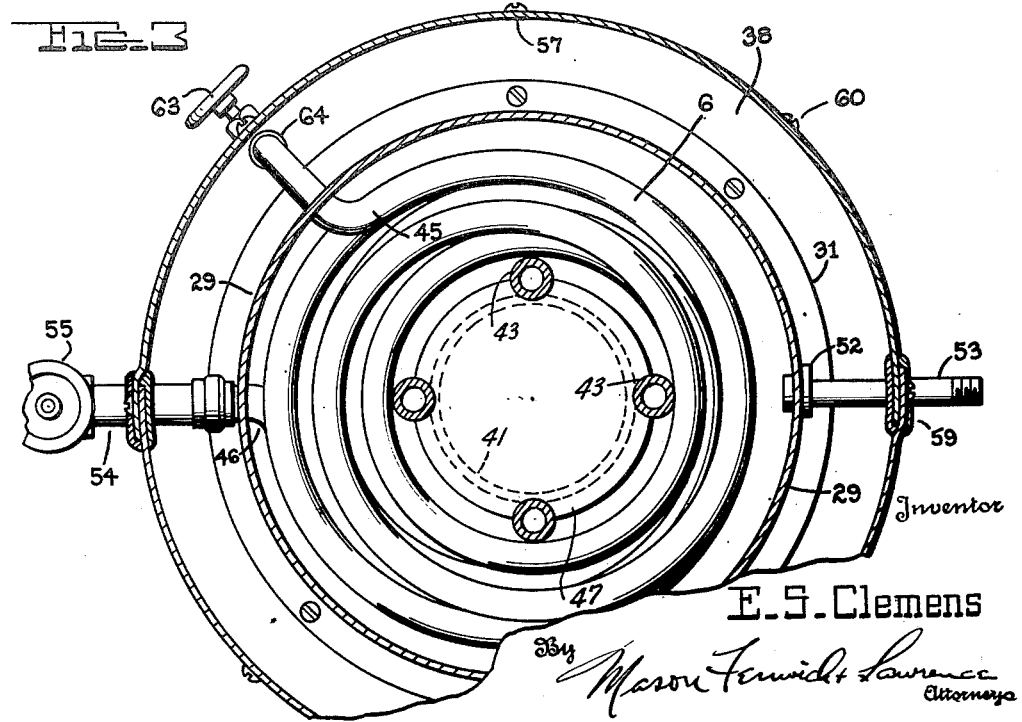

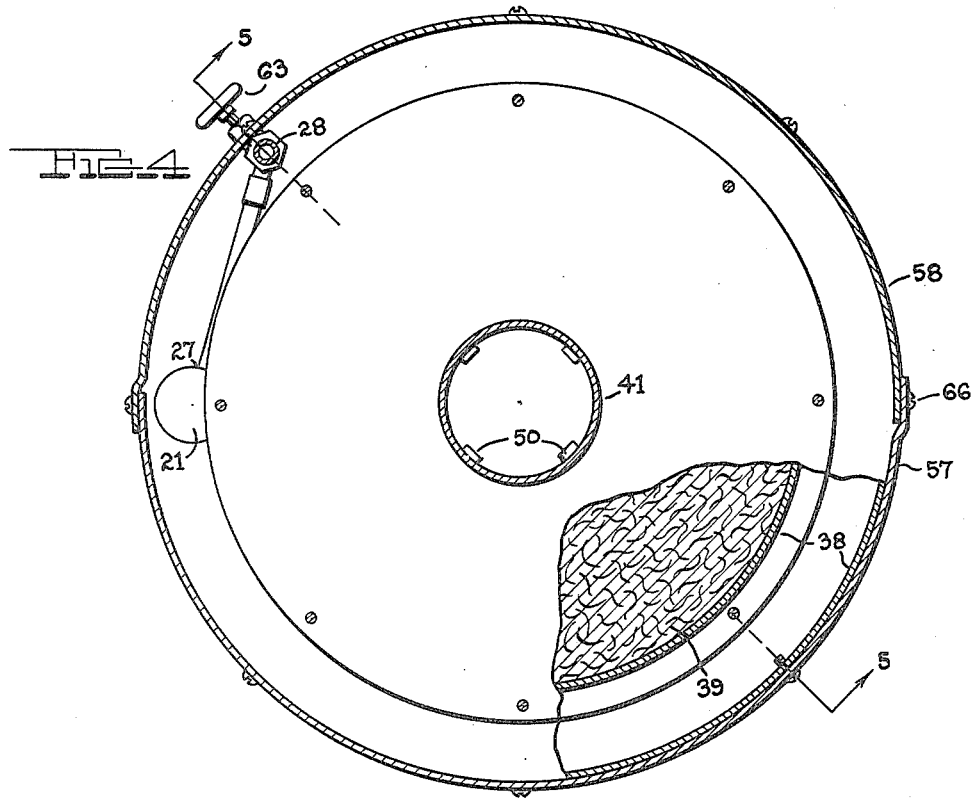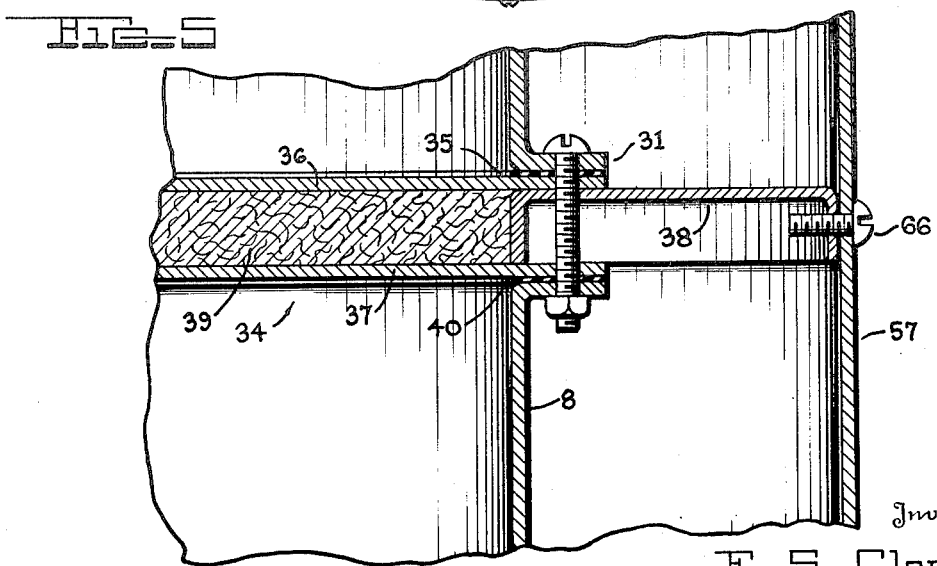

2,475,482

UNITED STATES PATENT OFFICE 2,475,482

WATER DISTILLATION UNIT

Edwin S. Clemens, New Orleans, La., assignor to Higgins Industries, Inc., New Orleans, La., a corporation of Louisiana Application October 5, 1945, Serial No. 620,589

9 Claims. (Cl. 202—194)

This invention relates to a water distillation unit.

It has for its general object the provision of apparatus constructed to deliver the maximum volume of potable water for a given amount of applied heat; which maintains a constant rate of distillation and condensation, having provisions for venting dissolved and volatile gases, thus effecting preliminary partial purification of the water; having means for maintaining constant water level in the evaporator, means for bleeding the evaporator to prevent undue rise in the solids or solution concentration in the evaporator, and means for flushing all water passages when necessary, and which is adapted to serve as a source of hot water, while operating, for domestic and other purposes.

A more specific object of the invention is the novel construction and arrangement of parts in the interest of mechanical stability, efficiency of operation, and ease of assemblage.

Other objects of the invention will appear as the following description of a preferred and practical embodiment thereof proceeds.

In the drawings which accompany and form a part of the following specification:

Figure 1 is a vertical section through a water distillation unit embodying the principles of the invention;

Figure 2 is a cross-section in a diametrical plane taken along the line 2—2 of Figure 1;

Figure 3 is a similar cross-section, partly broken away, taken along the line 3—3 of Figure 1;

Figure 4 is a similar cross-section partly broken away, taken along the line 4—4 of Figure 1;

Figure 5 is a fragmentary cross-section in an axial plane, taken along the line 5—5 of Figure 4.

Referring generally to Figure 1, the water distillation unit comprises an evaporator 1, a condenser 2 and an outer casing 3, the latter figuring in the structural rigidity of the apparatus. The lower part of the evaporator, up to the level of water indicated in Figure 1, may be referred to as the boiler 4, and the space within the evaporator above the boiler 4 as the steam chamber 5. The condenser contains the tubular coil 6, through which cooling water passes, and a chamber 7 surrounding the coil 6, in which the steam from the evaporator is condensed.

Although, of course, neither size nor dimensions are critical to the invention, for the sake of imparting a concrete concept of this apparatus it may be stated that in a popular size in which it is manufactured the overall height is about thirty-five inches, and the overall diameter about fifteen inches. In a distillation unit of this size, the boiler will contain about thirty pounds of water. As will later appear, the cooling water from the condenser, or at least a part thereof, passes as makeup water into the boiler of the evaporator, so that the water in the boiler is preheated.

Now, referring to the evaporator 1, it consists of a cylindrical shell 8, the lower end 9 of which is flush with and forms part of the supporting foot or bottom of the apparatus. The upper end is outwardly flared, as at 10, providing an outwardly extending annular flange to which the condenser is secured. At some distance from its bottom end, the shell 8 is closed by a transverse peripherally flanged plate 11, which is secured, preferably by welding or soldering to the shell 8 forming the water-tight bottom of the boiler 4. The external chamber 12 beneath the plate 11 is adapted to contain the base portions 13 of the electrical heating elements 14 which extend into the boiler. There may be one or more of these. They are introduced through suitable apertures in the plate 11, which apertures are suitably sealed so as to be water-tight.

In the event that other heating means than electrical are employed, the external chamber 12 provides a housing for such heating means. A transverse annular channel 15 with downwardly depending external and internal flanges fits snugly about the lower end of the shell 8, and is secured thereto as by welding. The flanges of said channel terminate in a transverse plane, which embraces the lower end of the shell 8. The boiler has a side connection 16 near the bottom plate 11 for a bleed pipe 17, controlled by the valve 18.

Suitably secured to the outer side of the shell 8 is the constant level maintaining device 19 for feeding make-up water to the boiler. This consists of an outer tube 20 of relatively large diameter, having a closed top 21 and extending to a point below the level of the bottom plate 11 and to a point above the desired water level in the boiler. The lower part of the tube 20 communicates with the lower part of the boiler by means of a nipple 22, and the upper part of said tube, above the water level, communicates with atmosphere by means of the nipple 23. The tube 20 has a bottom 24, through which passes a tube 25 of relatively small diameter, the lower extending end of which is connected to an elbow 26, through which hot water in excess of the make-up needs of the boiler may be discharged to a drain, or utilized for domestic or other purposes. The tube 25 extends axially within the tube 20, having an open top which terminates at the desired water level. The outer tube 20 has a side connection 27, see also Figure 2, connected to the upper or outlet end of the condenser cooling water coil by the pipe 28, shown in broken lines in Figure 1. The above described features, with the exception of the pipes 17 and 28, are connected in unitary manner, and constitute the evaporator unit.

The condenser 2 consists of a cylindrical shell 29 having the same diameter as the shell 8 of the evaporator, and having out-turned peripheral flanges 30 and 31 at its upper and lower ends. A top plate 32 is bolted to the upper flange 30, a gasket 33 intervening. A bottom member 34 is bolted to the lower flange 31, a gasket 35 being provided to seal the joint. The bottom member is of composite structure, consisting of similar inner and outer plates 36 and 37, spaced apart through the insertion of the annular channel member 38 between their peripheral margins. The space between the plates 36 and 37 is filled with heat insulation material 39, such as fiberglass. The lower plate 37 rests upon the out-turned flange 10 at the upper end of the condenser shell, single bolts passing through the lower flange of the condenser shell 29, the gasket 35, the plate 36, the web of the annular channel member 38, the lower plate 37, and the upper flange 10 of the condenser shell, thus securing the condenser to the evaporator. A gasket 40 is shown, sealing the joint between the evaporator and condenser. The bottom member 34 is provided with a central aperture, through which extends a wide steam tube 41, the upper end extending to a point adjacent the upper part of the condenser, while the lower end projects a short distance into the steam chamber 5 of the evaporator. The steam tube 41 is secured to the upper plate 36 of the bottom member 34 in watertight manner, as by soldering, the soldered joint being indicated at 42. Preferably, the steam tube 41 is also soldered to the lower plate 37 of the bottom member.

The top plate 32 is provided at equal distances from its center with a series of vertical vent tubes 43, which extend downwardly to a point adjacent the bottom of the condenser and upwardly some distance above the top plate 32. The inner portions of these tubes extend in close relation to the steam tube 41, which is telescoped between them. The vent tubes 43 are preferably soldered to the top plate 32, as indicated at 44, to make a fluid-tight joint.

The condensing coil 6 is within the shell 29, having its upper and lower ends 45 and 46 extended through apertures in the shell 29, with a fluid-tight joint between said ends and the shell. Figure 1 shows that the helices of the tubular coil 6 have staggered diameters whereby certain helices embrace closely the vent tubes 43, while other helices extend to a mid position between the shell 29 and the steam tube 41, while still other helices extend adjacent the shell 29. This staggered arrangement of the helices places them at various radial distances within the chamber 7, in positions where one does not unduly blanket another, and each is in best position to most efficiently contact the vapor within the chamber 7. The helical arrangement, as shown, is merely illustrative of several equivalent modes of winding which might be adopted, it being important only that certain helices shall closely embrace the vent tubes 43, since the latter in conjunction with the steam tube 41 are relied upon to support the tubular coil within the condenser. In assembling, the coil is placed within the shell 29 before either the top plate 32 or bottom member 34 is put in place. The coil is then shifted laterally until its ends protrude through the apertures in the side of the shell. Then the top cover 32 is put in place, the vent tubes 43 which are attached thereto being introduced through the helices of smallest diameter. Then the bottom member 34 is put in place, the steam tube 41 being slidably inserted between the vent tubes 43.

The top plate 32 has an upwardly convex baffle 47 secured to its lower side at the center, said baffle having arcuate cutouts in its periphery which fit closely about the vent tubes 43. The baffle 47 confronts the open upper end of the steam tube 41 in spaced relation thereto and diverts the steam issuing from said steam tube laterally in all directions into the upper part of the condenser chamber 7.

The lower end of the steam tube 41 which projects into the steam chamber 5 of the evaporator is provided with an annular rib 48. This forms means for the attachment of the baffle 49, which is positioned in the upper part of the steam chamber 5 and has spring clips 50 secured to its upper face, the ends of which are indented to form channels 51 which fit about the rib 48 and hold the baffle 49 removably in place.

The condenser shell 29 is provided at one side near the bottom with a bushing 52, to receive the distilled water discharge pipe 53. A raw water supply pipe 54 controlled by the valve 55 is connected to the lower end of the tubular coil 6. The upper end of said tubular coil discharges through the pipe 28 to the constant level make-up device 19 of the evaporator, as previously described. The upper end of the condenser shell 29 below the out-turned upper flange 30 is provided with the annular channelled member having downturned flanges, said member being bolted in place by the same bolts which secure the upper plate 32 to the condenser shell.

The evaporator and condenser shells are surrounded in spaced relation by an outer casing 56, which extends from the level of the foot of the evaporator shell to the level of the web of the upper annular channel member 55, said shell contacting the outer flanges of the annular channel members 15, 38 and 55, and being bolted thereto by the bolts 66. Said outer casing is preferably formed of two semi-cylindrical parts 57 and 58, lapping along their longitudinal margins. The raw water supply pipes 54, the nipple 23 and the hot water discharge pipe 26 are in longitudinal alignment on one side of the distillation unit and the distilled water discharge pipe 53 and bleed pipe 17 are in longitudinal alignment on the opposite side, and the outer casing 56 is so arranged that said pipes pass through apertures in the respective lapped margins of the halves of said casing. Said margins are formed with open ended slots having circular inner ends which match to form circular apertures surrounding the respective pipes and nipple. Said pipes and nipple are provided with peripherally externally channelled bushings 59, into the channels of which the lapped margins of the halves of the outer casing slip so that the bushings conceal the open ended slots, and by means of which lapped margins said bushings are held firmly in position. The lapped margins are secured together by a series of screws 60. The pipe 28 which connects the outlet of the condenser coil with the constant level maintaining device extends within the annular space defined within the outer casing and has a regulating valve 61, the neck of which extends through an opening 62 in the outer casing, and has an external operating knob 63. The pipe 28 passes through a hole 64 in the annular channel member 38. The outer casing is also provided with a hole 65, through which the electric wire feeding the heating elements, passes.

The upper part of the outer casing is surrounded by a band 67, which forms the seat for the edge of a hood 68, which is of such diameter as to overlap the upper end of the outer casing. The hood is bolted through the outer casing, and the outer flange of the upper annular channel member 55 by the bolts 66.

The hood is provided with holes 69, which register with the vent tubes 43, and through which the upper ends of said tubes pass when the hood is first assembled. Afterwards, the projecting ends of said tubes are ground off flush with the top of the hood, as illustrated in Figure 1.

In operation, raw water is admitted to the condenser coil through the pipe 54 by opening the supply valve 55, the water flowing from the condenser coil through the pipe 28 into the outer tube 20 of the constant level maintaining device until the water reaches the level as shown, after which excess water overflows through the inner pipe 25 and is discharged through the elbow 26. The heat is then turned on and the regulating valve adjusted so that the discharging water preferably has a temperature of from 190° to 200° F., or until, when the distillation unit is in full operation, a slight wisp of steam occasionally issues from the vent tubes 43. Ordinarily, after having once been set, the regulating valve does not have to be adjusted. Since the applied heat is constant and a constant water level is maintained, the rate of evaporation and distillation are also constant. The water vapor fills the steam space 5, passed upward through the steam tube 41, is deflected by the baffle 47, passes into the condensing chamber 7, and comes into contact with the staggered helices of the condensing coil against which it is condensed and accumulates in the bottom of the condensing chamber 7, from which it is discharged through the pipe 53. The purpose of the baffle 49 is to guard the entrance to the steam tube 41 and prevent raw water from splashing up through the steam tube 41 under the energy of ebullition and contaminating the distilled water in the condenser chamber.

In the event that the raw water is hard or otherwise charged with substances which might objectionably increase their concentration in the water body in the boiler 4, the valve 18 which controls the bleed pipe 17 may be cracked to permit a continuous bleeding of some of the water from the boiler, thus permitting automatic dilution of the water body by raw water supplied through the constant level maintaining device.

Occasionally, it may be desirable to flush the water passages, including the boiler. This is done by first opening the supply valve 55 wide, and opening the bleed valve 18 wide. Then the regulating valve 61 is gradually opened until it is open as wide as possible, or until water starts flowing from the nipple 23. Then the regulating valve is closed slowly until water stops running from this nipple. This will allow the maximum amount of water to circulate through the condenser coils and the evaporator and to flush out. After flushing, the regulating valve is closed to its normal position and the valve 18 is either closed entirely or reset to the extent of opening to permit normal bleeding.

While I have in the above description disclosed what I believe to be a preferred and practical embodiment of my invention, it will be understood to those skilled in the art that the specific details of construction are illustrative and not to be construed as limiting the scope of the invention.

What I claim as my invention is:

1. In a water distillation unit, a condenser comprising a shell, top and bottom members secured to opposite ends of said shell defining therewith a condensing chamber, a steam tube carried by said bottom member opening therethrough, and extending upward within said shell, a group of vent tubes carried by said top member opening therethrough, and extending downward within said shell, closely surrounding said steam tube, and a condensing coil within said shell having helices closely embracing said group of vent tubes, whereby said coil is mutually supported by said steam tube and vent tubes.

2. In a water distillation unit, an evaporator shell, and above it a condenser shell, said shells being outwardly flanged at their adjacent ends, a partition between said shells forming the bottom of the condenser shell and the top of the evaporator shell, comprising coaxial spaced parallel plates having their margins engaging the respective flanges at the adjacent ends of said shells, an intermediate annular channel member having inner and outer peripheral flanges, transversely arranged coaxially of said shells with its inner portion including said inner flange between said plates, heat insulation material within the space between said plates, means for securing said shells and partition together through the adjacent flanges of said shells, said plates and the intervening channel member, upper and lower annular channel members similar to said intermediate channel member and of the same outside diameter as said intermediate channel member, closely surrounding said shells at points remote from their adjacent ends and secured thereto, and an outer casing extending from said upper to said lower channel member secured to the outer flanges of said channel members.

3. Water distillation unit as claimed in claim 2, including an open ended steam tube passing through said partition and secured to said plates, having a portion of major length extending into said condenser shell and a portion of minor length extending into said evaporator shell.

4. Water distillation unit as claimed in claim 2, including an open ended steam tube passing through said partition and secured to said plates, having a portion of major length extending into said condenser shell and a portion of minor length extending into said evaporator shell, the latter portion having a circumferential bead, and a baffle guarding the lower open end of said steam tube having spring fingers engaging said bead removably supporting said baffle on said steam tube.

5. In a water distillation unit, a condenser comprising a shell, top and bottom members secured to opposite ends of said shell defining therewith a condensing chamber, a steam tube carried by said bottom member opening therethrough and extending upward within said shell, a group of vent tubes carried by said top member opening therethrough and extending downwardly within said shell, closely embracing said steam tube, a condensing coil within said shell having helices closely surrounding said group of vent tubes whereby said coil is mutually supported by said steam tube and vent tubes, an outer casing in spaced relation to said shell including a hood overlying said top member, said vent tubes extending to said hood and opening therethrough.

6. In a water distillation unit, a condenser comprising a shell, top and bottom members secured to opposite ends of said shell defining therewith a condensing chamber, a steam tube carried by said bottom member opening therethrough and extending upward within said shell, a group of vent tubes carried by said top member opening therethrough and extending downward within said shell, closely surrounding said steam tube, a condensing coil within said shell having helices closely embracing said group of vent tubes whereby said coil is mutually supported by said steam tube and vent tubes, and a baffle secured to the under side of said top member in spaced relation to the upper end of said steam tube, closely surrounded by said vent tubes.

7. In a water distillation unit, a condenser comprising a shell, top and bottom members secured to opposite ends of said shell defining therewith a condensing chamber, a steam tube carried by said bottom member opening therethrough and extending upward within said shell, a group of vent tubes carried by said top member opening therethrough and extending downward within said shell, closely surrounding said steam tube, a condensing coil within said shell having helices closely embracing said group of vent tubes whereby said coil is mutually supported by said steam tube and vent tubes, and a baffle secured to the under side of said top member in spaced relation to the upper end of said steam tube, closely surrounded by said vent tubes having indentations in its periphery fitting about said vent tubes.

8. In a water distillation unit, an evaporator shell and above it a condenser shell, a partition between said shells constituting the top of one and the bottom of the other comprising spaced parallel plates, an intermediate annular channel member having inner and outer peripheral flanges, transversely arranged coaxially of said shells with only its inner portion including said flange, positioned between said plates acting as a spacer therefor, means for securing said shells and partition together, upper and lower channel members similar to said intermediate channel member and of the same outside diameter as the latter, respectively closely surrounding said condenser shell at the top and said evaporator shell at the bottom and being secured thereto, an outer casing extending from said upper to said lower channel member, secured to the outer flanges of said channel members, a bottom for said evaporator shell located at a distance from the lower end of said evaporator shell defining within said shell an external chamber for receiving heating means, a constant level maintaining make-up water feeding device within said casing carried externally by said evaporator shell comprising a tube of relatively large diameter communicating with said evaporator shell, closed to the space between said casing and shells and having a vent near its top through said casing to atmosphere, an overflow tube of relatively small diameter extending longitudinally within said tube of relatively large diameter having its open upper end positioned at the desired level of water within said evaporator shell, a drain pipe from the lower end of said overflow tube extending through said casing, a condensing coil within said condenser shell, a raw water supply pipe extending through said casing to the lower end of said coil, a connection within said casing between the upper end of said coil and said make-up water feeding device, a regulating valve in said connection having its operating handle external to said casing, said partition having a passage therethrough establishing communication between the interiors of said shells, and a top closure for said condenser shell.

9. In a water distillation unit, an evaporator shell and above it a condenser shell, a partition between said shells provided with means forming a steam passage therethrough, similar transversely arranged annular channel members having the same external diameters, greater than that of said shells, arranged coaxially of said shells, one about the upper end of the condenser shell, one about the lower end of the bottom shell, and the other in the zone of the partition, said annular members being fixed to said shells, a coil in said condenser shell, a constant level make-up water feeding device on the outside of said evaporator shell, a raw water supply pipe connected to one end of said coil, the other end of said coil being connected to said make-up water feeding device, a drain pipe from said make-up water feeding device, a condensate discharge pipe from the lower part of said condenser shell, a flush pipe from the lower part of said evaporator shell, said raw water pipe and drain pipe lying in an axial plane on one side of said unit, and said condensate discharge pipe and flush pipe lying in said axial plane on the opposite side of said unit, said pipes extending outwardly beyond said annular channel members, a cylindrical outer casing divided into longitudinal halves with lapping margins, adjacent margins on each side having matching slots opening in the longitudinal edges of said margins adapted to embrace said pipes when said casing halves are brought together in lapped relation, said casing being secured to said annular channel members.

EDWIN S. CLEMENS.

REFERENCES CITED

The following references are of record in the file of this patent:

UNITED STATES PATENTS

| Number | Name | Date |
|---|---|---|
| 404,512 | Vail | June 4, 1889 |
| 544,810 | Kelly | Aug. 20, 1895 |
| 825,178 | Barnstead | July 3, 1906 |
| 829,999 | Parker | Sept. 4, 1906 |
| 1,222,801 | Rosenbaum | Apr. 17, 1917 |
| 2,303,126 | Koppel | Nov. 24, 1942 |
| 2,392,893 | Williamson | Jan. 15, 1946 |